United States Patent
Wen et al.

(10) Patent No.: US 11,905,942 B2
(45) Date of Patent: Feb. 20, 2024

(54) BOOSTER PUMP AND WATER PURIFICATION DEVICE

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Zhihua Wen, Foshan (CN); Fangzhen Zheng, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 330 days.

(21) Appl. No.: 17/295,423

(22) PCT Filed: Dec. 3, 2019

(86) PCT No.: PCT/CN2019/122800
§ 371 (c)(1),
(2) Date: May 19, 2021

(87) PCT Pub. No.: WO2020/114401
PCT Pub. Date: Jun. 11, 2020

(65) Prior Publication Data
US 2022/0010790 A1    Jan. 13, 2022

(30) Foreign Application Priority Data
Dec. 3, 2018 (CN) .......................... 201811472253.3

(51) Int. Cl.
*F04B 43/04* (2006.01)
*F04B 43/02* (2006.01)
(Continued)

(52) U.S. Cl.
CPC .............. *F04B 43/04* (2013.01); *C02F 1/001* (2013.01); *F04B 43/026* (2013.01);
(Continued)

(58) Field of Classification Search
CPC ...... F04B 43/026; F04B 43/04; F04B 53/001; F04B 53/14; F04B 53/16; F04B 43/0009;
(Continued)

(56) References Cited

U.S. PATENT DOCUMENTS 4,124,488 A * 11/1978 Wilson ................... B01D 61/06
417/465
2015/0198154 A1    7/2015 Cai et al.
(Continued)

FOREIGN PATENT DOCUMENTS

CN    105508206 A  *  4/2016
CN    105508206 A     4/2016
(Continued)

OTHER PUBLICATIONS

Supplementary European Search Report regarding EP counterpart with Application No. 19893364.0.
(Continued)

*Primary Examiner* — Dominick L Plakkoottam

(57) ABSTRACT

A booster pump and a water purification device. The booster pump comprises: a pump body having an installation chamber extending in a first direction; a motor disposed in the installation chamber, the motor comprising a motor body and a motor shaft passing through two ends of the motor body in the first direction; and a first pump head and a second pump head respectively installed at two ends of the
(Continued)

pump body in the first direction, two ends of the motor shaft being drivingly connected to the first pump head and the second pump head, respectively.

13 Claims, 12 Drawing Sheets

(51) Int. Cl.
  *F04B 53/14* (2006.01)
  *C02F 1/00* (2023.01)
  *F04B 53/00* (2006.01)
  *F04B 53/16* (2006.01)
(52) U.S. Cl.
  CPC ............ *F04B 53/001* (2013.01); *F04B 53/14* (2013.01); *F04B 53/16* (2013.01); *C02F 2201/002* (2013.01); *F05B 2210/11* (2013.01)
(58) Field of Classification Search
  CPC .... F04B 53/00; C02F 1/001; C02F 2201/002; F05B 2210/11; B01D 35/02
  See application file for complete search history.

(56) References Cited

U.S. PATENT DOCUMENTS

| | | | |
|---|---|---|---|
| 2017/0290470 A1 | 10/2017 | Ciavarella et al. | |
| 2018/0038363 A1 | 2/2018 | Trethewey | |

FOREIGN PATENT DOCUMENTS

| | | | | | |
|---|---|---|---|---|---|
| CN | 105604931 | A | | 5/2016 | |
| CN | 105889037 | A | * | 8/2016 | ............ F04B 43/026 |
| CN | 205533045 | U | | 8/2016 | |
| CN | 205533045 | U | * | 8/2016 | |
| CN | 106121975 | A | | 11/2016 | |
| CN | 106989001 | A | * | 7/2017 | .............. F04B 39/00 |
| CN | 106989001 | A | | 7/2017 | |
| CN | 107288858 | A | | 10/2017 | |
| CN | 207212637 | U | | 4/2018 | |
| CN | 109306947 | A | | 2/2019 | |
| CN | 209414118 | U | | 9/2019 | |
| EP | 2832998 | A1 | | 2/2015 | |
| JP | 2007046529 | A | | 2/2007 | |
| JP | 4585405 | B2 | * | 11/2010 | |
| JP | 2012188983 | A | | 10/2012 | |
| JP | 5878625 | B2 | | 3/2016 | |
| KR | 20150133635 | A | | 11/2015 | |

OTHER PUBLICATIONS

The first OA of CN application No. 201811472253.3.
The second OA of CN application No. 201811472253.3.
Notice of Allowance dated Apr. 27, 2023 regarding the KR counterpart 10-2021-7015812.
First Office Action dated Sep. 29, 2022 regarding the KR counterpart 10-2021-7015812.
Notice of Re-examination dated May 30, 2023 regarding the CN counterpart 201811472253.3.
Reject Decision dated Jun. 2, 2021 regarding the CN counterpart 201811472253.3.
Notice of Allowance received in CN Application No. 201811472253.3; dated Aug. 30, 2023.

* cited by examiner

BOOSTER PUMP AND WATER PURIFICATION DEVICE

CROSS-REFERENCES TO RELATED APPLICATIONS

The present disclosure is a national phase application of International Application No. PCT/CN2019/122800, filed on Dec. 3, 2019, which claims priority to Chinese Patent Application No. 201811472253.3, filed on Dec. 3, 2018, the entireties of which are herein incorporated by reference.

FIELD

The present disclosure relates to the field of a water purification product, and in particular to a booster pump and a water purification device.

BACKGROUND

At present, most water purifiers on the market use membrane cartridges for water filtration. A booster pump is a driving component for the membrane cartridge water purifier. The quality of the booster pump directly affects the water purification effect and customer experience. The existing booster pump adopts an inclined sleeve to convert a rotation of a motor shaft into an axial push and pull motion, to drive the membrane to change the volume of a cavity, so that a function similar to a function of a piston is realized.

In order to increase a flow rate of the booster pump, it is usually achieved by increasing the rotation speed of the motor or increasing the size of the pump. However, the above two manners are likely to cause the load of the pressurization cavity of the booster pump to be excessively large, and then shorten the service life of the booster pump.

SUMMARY

Problem

The main object of the present disclosure is to provide a booster pump, which is intended to solve the problem in the related art that the flow rate of the booster pump cannot be increased under the premise of guaranteeing the service life of the booster pump.

In order to achieve the above object, a booster pump proposed in the present disclosure includes:

- a pump body provided with a mounting cavity extending in a first direction;
- a motor arranged in the mounting cavity, the motor including a motor body, and a motor shaft passing through both ends of the motor body in the first direction; and
- a first pump head and a second pump head, the first pump head being mounted on one end of the pump body in the first direction and drivingly connected to one end of the motor shaft, and the second pump head being mounted on another end of the pump body in the first direction and drivingly connected to another end of the motor shaft.

In one embodiment, each of the first pump head and the second pump head is provided with a piston plate. Each end of the motor shaft is connected to the corresponding piston plate of the piston plates. Each of the piston plates is formed with at least two piston chambers. Each piston chamber communicates with a water intake end and a water drain end of the corresponding pump head, and the piston chambers are uniformly arranged around a center of the corresponding piston plate.

In one embodiment, a projection of the piston chambers of the first pump head and a projection of the piston chambers of the second pump head are misaligned with each other in a projection plane perpendicular to the first direction.

In one embodiment, the number of the piston chambers of the first pump head is the same as the number of the piston chambers of the second pump head. An angle between two adjacent piston chambers of the first pump head or the second pump head is defined as a. A misalignment angle between a projection of each of the piston chambers of the first pump head and a projection of the corresponding piston chamber of the piston chambers of the second pump head in the projection plane is defined as $\beta$. Herein, $\alpha$ and $\beta$ satisfy a relation of: $\beta=\alpha/2$.

In one embodiment, the number of the piston chambers of the first pump head is the same as the number of the piston chambers of the second pump head. An angle between two adjacent piston chambers of the first pump head or the second pump head is defined as $\alpha$. A misalignment angle between a projection of each of the piston chambers of the first pump head and a projection of the corresponding piston chamber of the piston chambers of the second pump head in the projection plane is defined as $\beta$. Herein, $\alpha$ and $\beta$ satisfy a relation of: $\beta=\alpha/4$.

In one embodiment, each of the first pump head and the second pump head is provided with three piston chambers, and a satisfies a relation of: $\alpha=120°$.

In one embodiment, the number of the piston chambers of the first pump head is the same as the number of the piston chambers of the second pump head. An operating interval between the first pump head and the second pump head is set at a preset central angle.

In one embodiment, a misalignment angle between a projection of each of the piston chambers of the first pump head and a projection of a corresponding piston chamber of the piston chambers of the second pump head in a projection plane perpendicular to the first direction is defined as $\beta$, and the preset central angle is defined as $\gamma$, $\beta$ and $\gamma$ satisfy a relation of: $\gamma=\beta/2$.

In one embodiment, $\beta$ satisfies a relation of: $\beta=60°$.

In one embodiment, each of a first flat surface for driving the first pump head is arranged on a peripheral surface of said one end of the motor shaft, and a second flat surface for driving the second pump head is arranged on a peripheral surface of said another end of the motor shaft. A normal angle between the first flat surface and the second flat surface is equal to the preset central angle.

In one embodiment, an interval between projections of any two adjacent piston chambers is regular.

In one embodiment, a first membrane is arranged on an inner side of a water inlet of each piston chamber, and a second membrane is arranged on an outer side of a water outlet of each piston chamber. The motor is a dual-shaft motor. Each end of the motor shaft of the motor is connected to the first membrane through an inclined bushing to drive the first membrane into a push and pull motion in an axial direction.

In one embodiment, each of the first pump head and the second pump head is in the form of a hollow discoid shape.

The present disclosure also provides a water purification device comprising a booster pump. The booster pump includes:

a pump body provided with a mounting cavity extending in a first direction;

a motor arranged in the mounting cavity, the motor including a motor body, and a motor shaft passing through both ends of the motor body in the first direction; and a first pump head and a second pump head, the first pump head being mounted on one end of the pump body in the first direction and drivingly connected to one end of the motor shaft, and the second pump head being mounted on another end of the pump body in the first direction and drivingly connected to another end of the motor shaft.

In one embodiment, the water purification device is a water purifier; or the water purification device is an automatic filter.

According to the embodiment of the present disclosure, the first pump head and the second pump head are provided in the booster pump, and the water entering into the booster pump is shared by the two pump heads, so that the load of each pump head is avoided being increased on the basis of increasing the flow rate of the booster pump, and effectively ensuring the service life of the booster pump. In particular, according to the embodiments of the present disclosure, the piston chambers in the two pump heads are misaligned with each other, so that the overall operating amplitude and noise of the booster pump are effectively reduced.

BRIEF DESCRIPTION OF THE DRAWINGS

In order to illustrate the embodiments of the present disclosure, the drawings required for describing the embodiments will be briefly discussed below, and the drawings in the following description are merely some embodiments of the present disclosure.

EXPLANATION OF REFERENCE NUMERAL

TABLE 1

Figure 1:
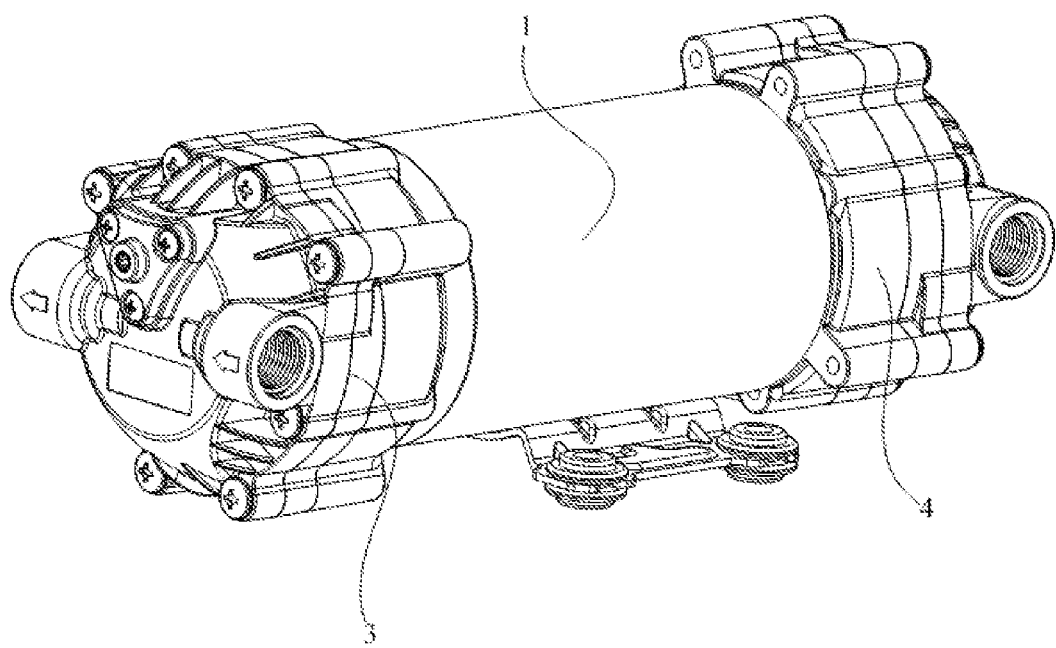
FIG. 1 is a schematic diagram of an embodiment of a booster pump of the present disclosure.
Figure 2:
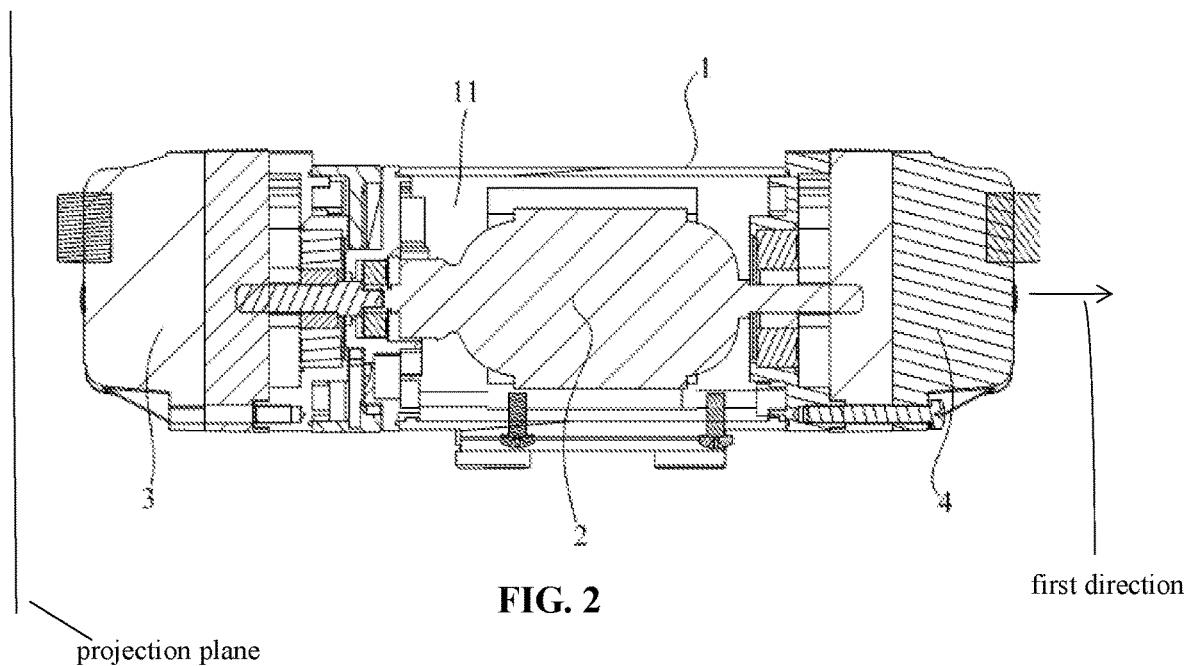
FIG. 2 is a schematic cross-sectional view of the booster pump in FIG. 1.
Figure 3:
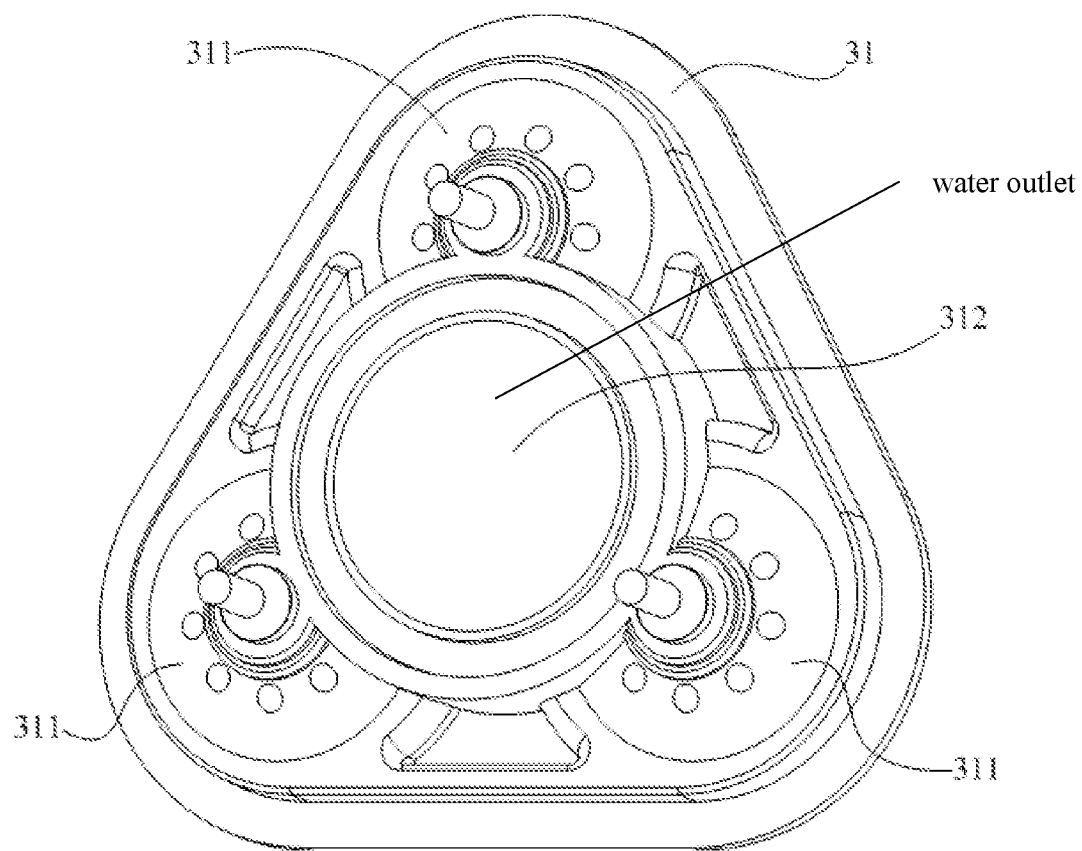
FIG. 3 is a schematic diagram of a piston plate in FIG. 1.
Figure 4:
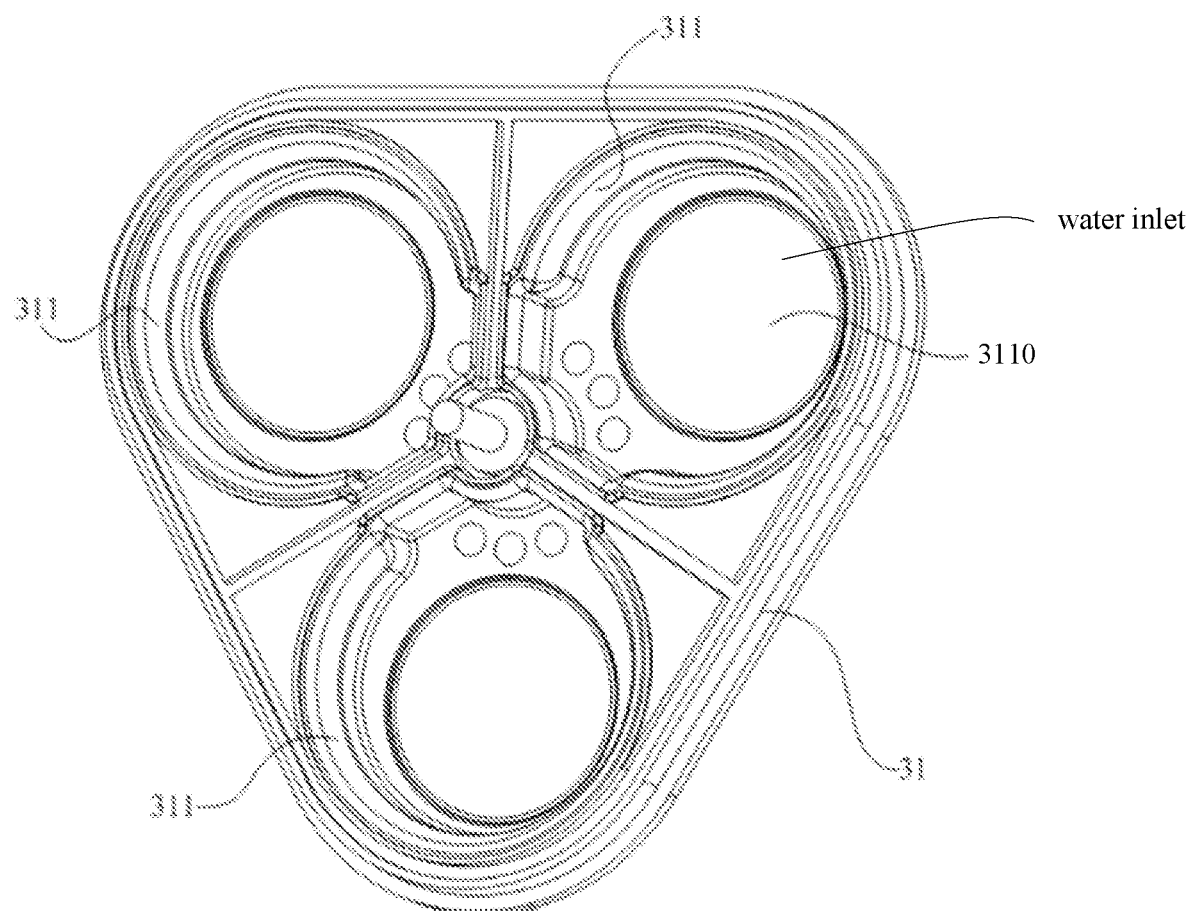
FIG. 4 is a schematic diagram of the piston plate in FIG. 3 from another angle of view.

| Reference numerals | Name | Reference numerals | Name |
| --- | --- | --- | --- |
| 1 | pump body | 11 | mounting cavity |
| 2 | motor | 21 | motor body |
| 22 | motor shaft | 221 | first flat surface |

TABLE 1-continued

| Reference numerals | Name | Reference numerals | Name |
| --- | --- | --- | --- |
| 222 | second flat surface | 3 | first pump head |
| 31 | piston plate | 311 | piston chamber |
| 3110 | first membrane | 312 | second membrane |
| 4 | second pump head | | |

DETAILED DESCRIPTION OF THE DISCLOSURE

The embodiments of the disclosure are described below with reference to the accompanying drawings in the embodiments of the disclosure. Apparently, the described embodiments are merely some of the embodiments of the disclosure, but not all the embodiments.

It should be understand that, if there are directional indications (such as "upper", "lower", "left", "right", "front", "back" . . . ) in the embodiments of the present disclosure, the directional indications are only used to explain the relative positional relationship, motion, and the like, between components in a posture. If the particular posture changes, the directional indication changes accordingly.

In addition, if there are descriptions of "first" and "second" in the embodiments of the present disclosure, the descriptions of "first" and "second" are used for descriptive purposes only and cannot be appreciated as indicating or implying their relative importance or implicitly indicating the number of indicated embodiments. Thus, features defining "first" and "second" may explicitly or implicitly include at least one such feature.

The present disclosure provides a booster pump, and a water purification device including the booster pump. For example, but not limited to, the water purification device may be a water purifier, an automatic filter, etc. It should be noted that the present design is not limited thereto, and the booster pump may also be applied to other equipment in which a flow path needs to be pressurized.

In an embodiment of the present disclosure, referring to FIG. 1 to FIG. 5, the booster pump includes:

a pump body 1 provided with a mounting cavity 11 extending in a first direction;

a motor 2 arranged in the mounting cavity 11, the motor 2 including a motor body 21, and a motor shaft 22 passing through both ends of the motor body 21 in the first direction; and a first pump head 3 and a second pump head 4, the first pump head 3 being mounted on one end of the pump body 1 in the first direction and drivingly connected to one end of the motor shaft 22, and the second pump head 4 being mounted on another end of the pump body 1 in the first direction and drivingly connected to another end of the motor shaft 22.

It should be understood that, for a booster pump of a cylindrical shape as a whole, the first direction is an axial direction of the booster pump. In this embodiment, the booster pump is a diaphragm pump. Each of the first pump head 3 and the second pump head 4 is provided with a piston plate 31. Each of the piston plate 31 is provided with piston chambers 311 (the inner surface of the piston plate 31 is recessed to form the piston chambers). A first membrane 3110 is arranged on an inner side of a water inlet of each piston chamber 311, and a second membrane 312 is arranged on an outer side of a water outlet of each piston chamber 311. The motor 2 is a dual-shaft motor. Each end of the motor shaft 22 of the motor is connected to the first membrane 3110 through an inclined bushing to drive the first membrane 3110 into a push and pull motion in the axial direction, so that the volume of each piston chamber 311 is changed to achieve the effect of pressurizing the water. It should be understood that, in this way, the water entering into the booster pump is shared by the two pump heads, so that the load of each pump head is avoided being increased while the flow rate of the booster pump is increased. Especially for a diaphragm pump, the wear on the membrane is avoided being exacerbated, while the flow rate of the diaphragm pump is increased, to ensure the service life of the diaphragm pump. It should be noted that, the present design is not limited thereto. In other embodiments, the booster pump may also be a pneumatic pump or other pumps.

According to the embodiments of the present disclosure, the first pump head 3 and the second pump head 4 are provided in the booster pump, and the water entering into the booster pump is shared by the two pump heads, so that the load of each pump head is avoided being increased on the basis of increasing the flow rate of the booster pump, and effectively ensuring the service life of the booster pump.

Figure 5:
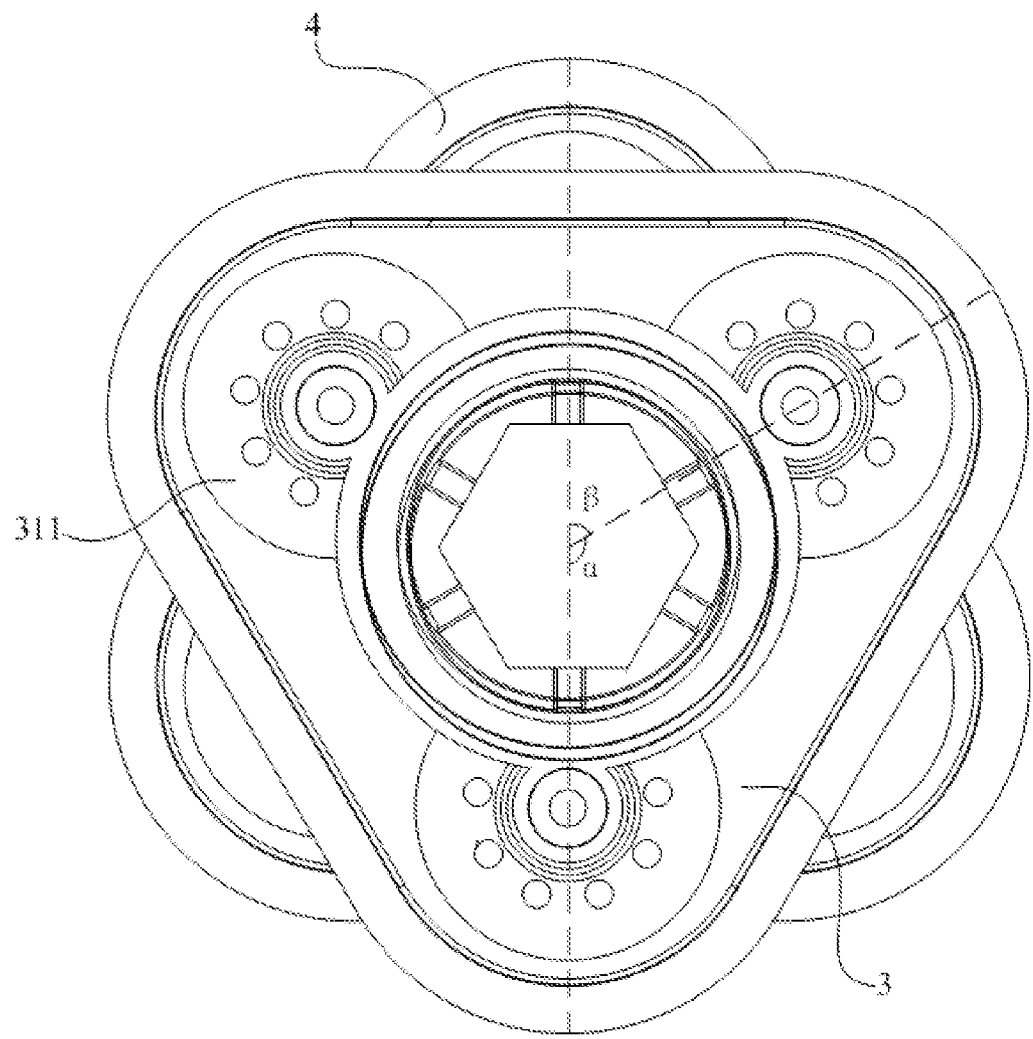
FIG. 5 is a schematic diagram of two piston plates in FIG. 1 in a projection plane.
Figure 8:
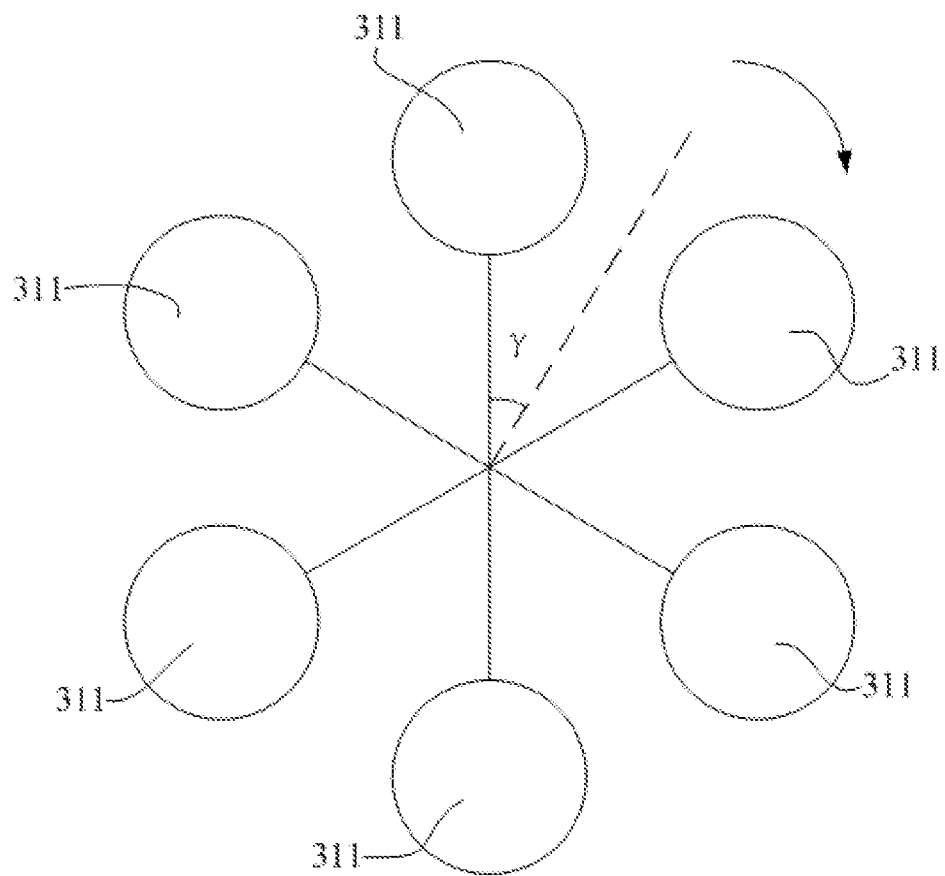
FIG. 8 is a schematic diagram of piston chambers of the two piston plates in FIG. 5 in a projection plane.

Referring to FIG. 5 and FIG. 8, in this embodiment, each of the first pump head 3 and the second pump head 4 is in the form of a hollow discoid shape. In order to improve the uniformity of the inlet water and the outlet water in the pump heads, each of the piston plate 31 is formed with at least two piston chambers 311, and the piston chambers 311 are uniformly arranged around a center of the corresponding piston plate. A water outlet of the piston chamber 311 is formed in the center of each piston plate 31, and the second membrane 312 is arranged on an outer side of the water outlet of each piston chamber 311. It can be understood that such a configuration facilitates reducing the vibration and noise during the operation of the booster pump, and improving the usage experience for the users. Generally, the piston plate 31 is formed with three piston chambers 311, and an angle between any two adjacent piston chambers 311 is 120°. It can be understood that if there are too many piston chambers 311, the interval between the adjacent piston chambers 311 is too small, so that the piston chambers 311 would interfere with each other and affect water inlet and outlet efficiency. However, if there are too few piston chambers 311, the load of the membrane is easily increased, so that the service life of the membrane is shortened. It should be noted that the present design is not limited thereto. In other embodiments, the piston plate 31 may also be formed with four or more piston chambers 311.

It can be understood that, if the two pump heads are completely aligned with each other, during the operation of the booster pump, the piston chambers 311 in the two pump heads simultaneously perform the water inlet and outlet processes. As such, the operating noise and operating amplitude of the booster pump at this moment would inevitably be relatively large. Thus, in order to reduce the operating noise and the vibration amplitude of the booster pump, in this embodiment, the piston chambers 311 of the first pump head 3 and the piston chambers 311 of the second pump head 4 are misaligned with each other in a same projection plane in the first direction. In this way, the water inlet process and the water outlet process in each piston chamber 311 of the pump heads at both ends of the booster pump are effectively misaligned. It should be noted that, the embodiment for the misalignment of the piston chambers 311 in the two pump heads is not limited to whether the number of the piston chambers 311 of the first pump head is the same as the number of the piston chambers 311 of the second pump head. That is, if the number of the piston chambers 311 of the first pump head is different from the number of the piston chambers 311 of the second pump head in other embodiments, the embodiment for the misalignment of the piston chambers 311 may still effectively reduce the operating noise and the vibration amplitude of the booster pump.

Generally, based on the embodiment that the piston plate 31 is formed with three piston chambers 311 and an angle between any two adjacent piston chambers 311 is 120°, in order to better improve the operating balance between the piston chambers 311 of the two pump heads, referring to FIG. 5 and FIG. 8, a misalignment angle between a projection of each of the piston chambers 311 of the first pump head 3 and a projection of the corresponding piston chamber 311 of the piston chambers 311 of the second pump head 4 in a projection plane perpendicular to the first direction is 60°. In one embodiment, referring to the drawings, one circle is divided evenly by six piston chambers 311, and an interval between projections of any two adjacent piston chambers 311 is regular. During the rotation of the motor shaft 22, the operating conditions of the piston chambers 311 in various directions correspond to each other and are balanced. It should be noted that, the concept of the present disclosure is not limited to the case where the piston plate 31 is provided with three piston chambers 311. An angle between two adjacent piston chambers 311 of the first pump head 3 or the second pump head 4 is defined as a. A misalignment angle between a projection of each of the piston chambers 311 of the first pump head 3 and a projection of the corresponding piston chamber 311 of the piston chambers 311 of the second pump head 4 in the projection plane perpendicular to the first direction is defined as β. In this case, in other embodiments, as long as α and β satisfy a relation of: β=α/2, the effect of improving the operating balance between the piston chambers 311 of the two pump heads can be achieved.

Figure 9:
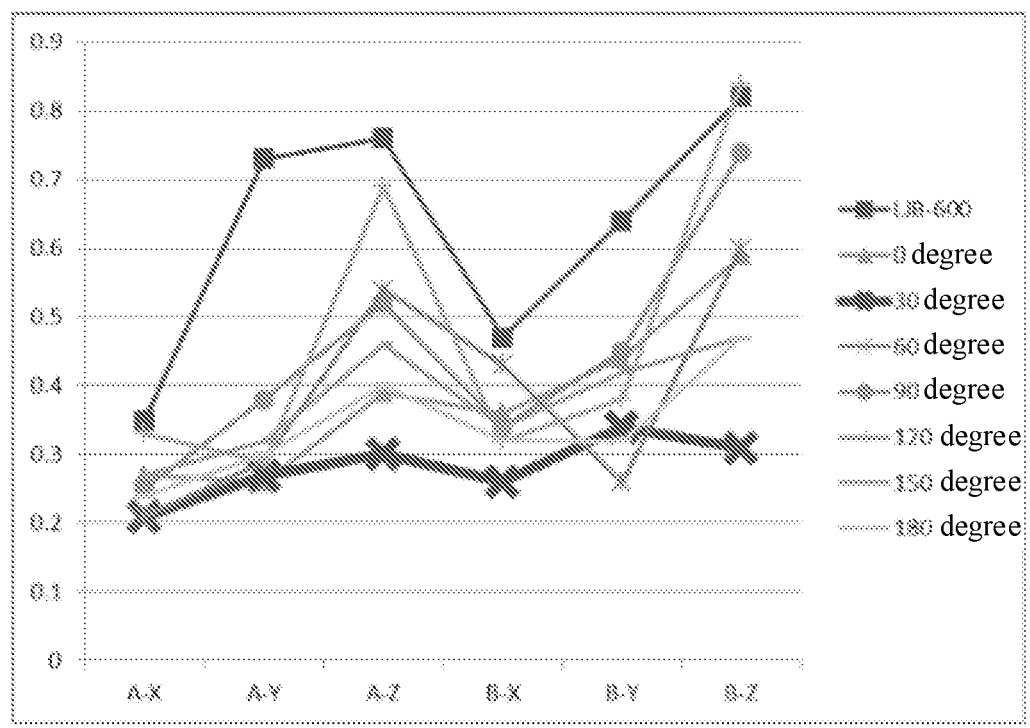
FIG. 9 is a line graph showing vibration of the booster pump in FIG. 1 at different preset central angles.
Figure 10:
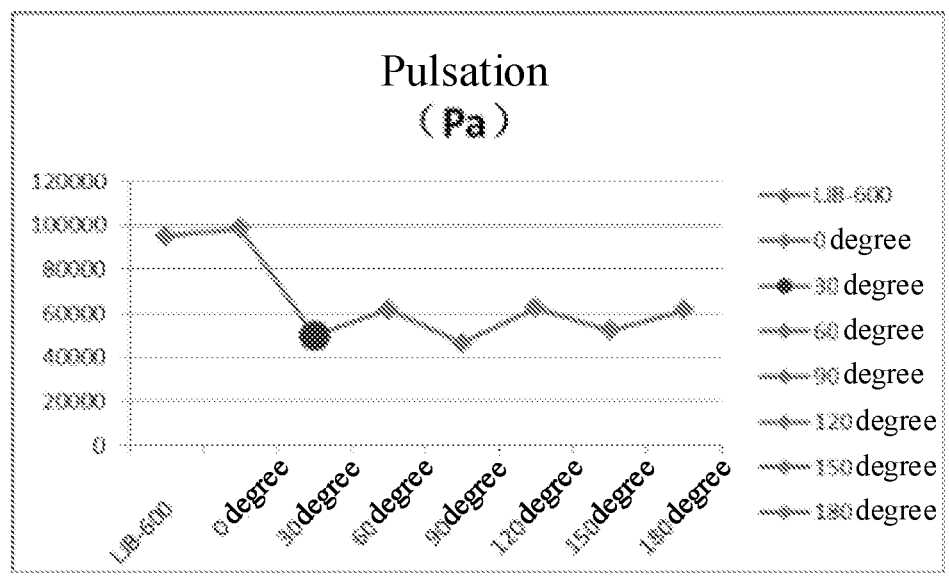
FIG. 10 is a line graph showing pulsation of water flow of the booster pump in FIG. 1 at different preset central angles.
Figure 11:
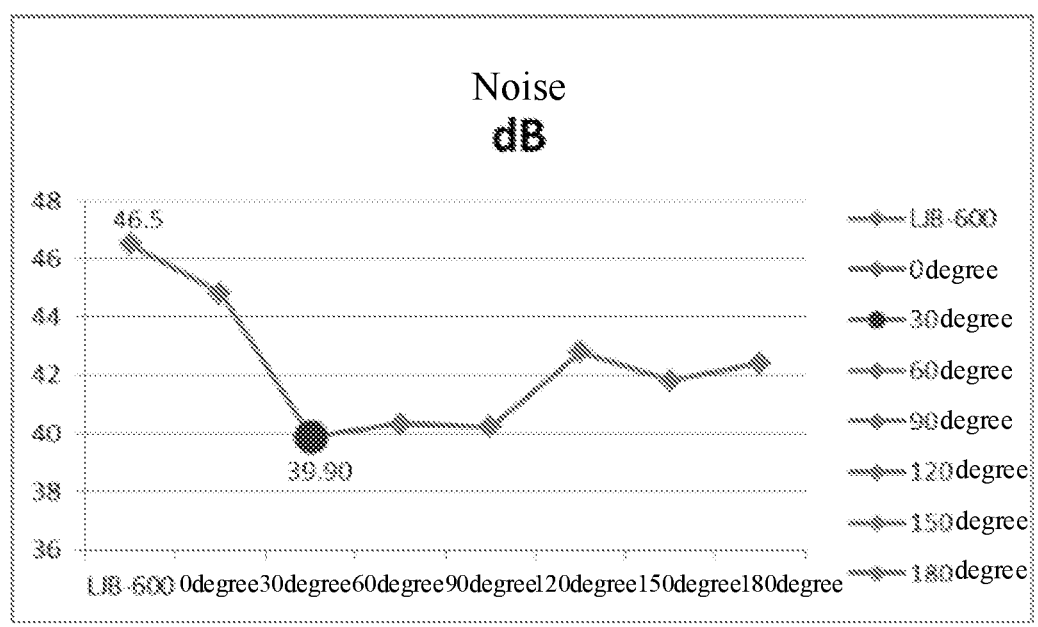
FIG. 11 is a line graph showing noise of the booster pump in FIG. 1 at different preset central angles.

Furthermore, an operating interval between the first pump head 3 and the second pump head 4 is set at a preset central angle. It can be understood that, such a configuration can better prevent the vibration and noise of the piston chambers 311 of the first pump head 3 and the second pump head 4 from being superimposed with each other during operation. In this embodiment, the piston plate 31 is formed with three piston chambers 311, an angle between any two adjacent piston chambers 311 is 120°, and a misalignment angle between a projection of each of the piston chambers 311 of the first pump head 3 and a projection of the corresponding piston chamber 311 of the piston chambers 311 of the second pump head 4 in a projection plane perpendicular to the first direction is 60°. Based on the embodiment described above, in order to better reduce the operating noise, the operating amplitude and the pulsation of water flow of the booster pump, the preset central angle is 30°. It can be understood that, referring to FIG. 8, the 60° angle between two piston chambers 311 is then bisected, to better improve the smoothness of the transition between the various piston chambers 311. As can be seen from the projection plane and in a clockwise direction, the adjacent piston chambers 311 operate sequentially. As can be seen in FIG. 9, the vibration of the booster pump in the XYZ directions at the preset central angle of 30° is weaker than the vibration of the booster pump in the XYZ directions at other preset central angles. As can be seen in FIG. 10, the pulsation of water flow of the booster pump at the preset central angle of 30° is weaker than the pulsation of water flow of the booster pump at other preset central angles. As can be seen in FIG. 11, the noise of the booster pump at the preset central angle of 30° is less than the noise of the booster pump at other preset central angles. It should be noted that, the embodiment that there is an operating interval between the two pump heads is not limited to whether the number of the piston chambers 311 of the first pump head is the same as the number of the piston chambers 311 of the second pump head or whether the piston chambers 311 of the first pump head is misaligned with the piston chambers 311 of the second pump head. That is, if the number of the piston chambers 311 of the first pump head is different from the number of the piston chambers 311 of the second pump head or the piston chambers 311 of the first pump head is completely aligned with the piston chambers 311 of the second pump head in other embodiments, the embodiment that there is an operating interval between the two pump heads may still effectively reduce the operating noise, the vibration amplitude and the pulsation of water flow of the booster pump. Moreover, the concept of the present disclosure is not limited to the case where the piston plate 31 is provided with three piston chambers 311. A misalignment angle between a projection of each of the piston chambers 311 of the first pump head 3 and a projection of the corresponding piston chamber 311 of the piston chambers 311 of the second pump head 4 in the projection plane perpendicular to the first direction is defined as β, and the preset central angle is defined as γ. In this case, in other embodiments, as long as β and γ satisfy a relation of: γ=β/2, the effect of improving the operating balance between the piston chambers 311 of the two pump heads can be achieved.

Figure 6:
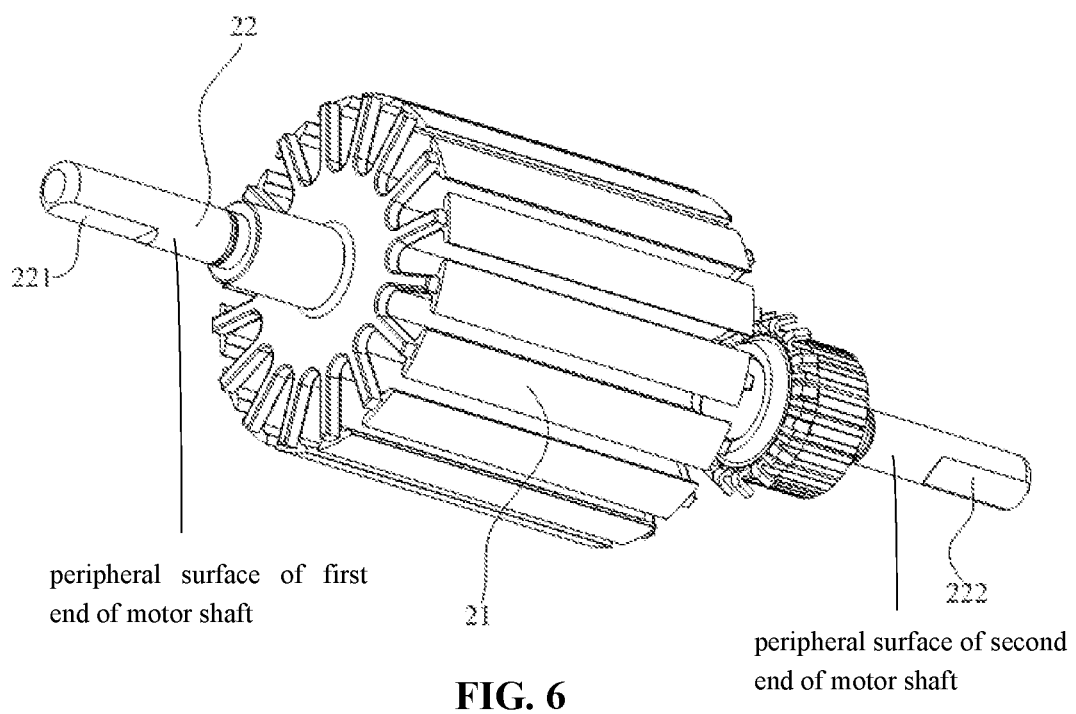
FIG. 6 is a schematic diagram of a motor in FIG. 2.
Figure 7:
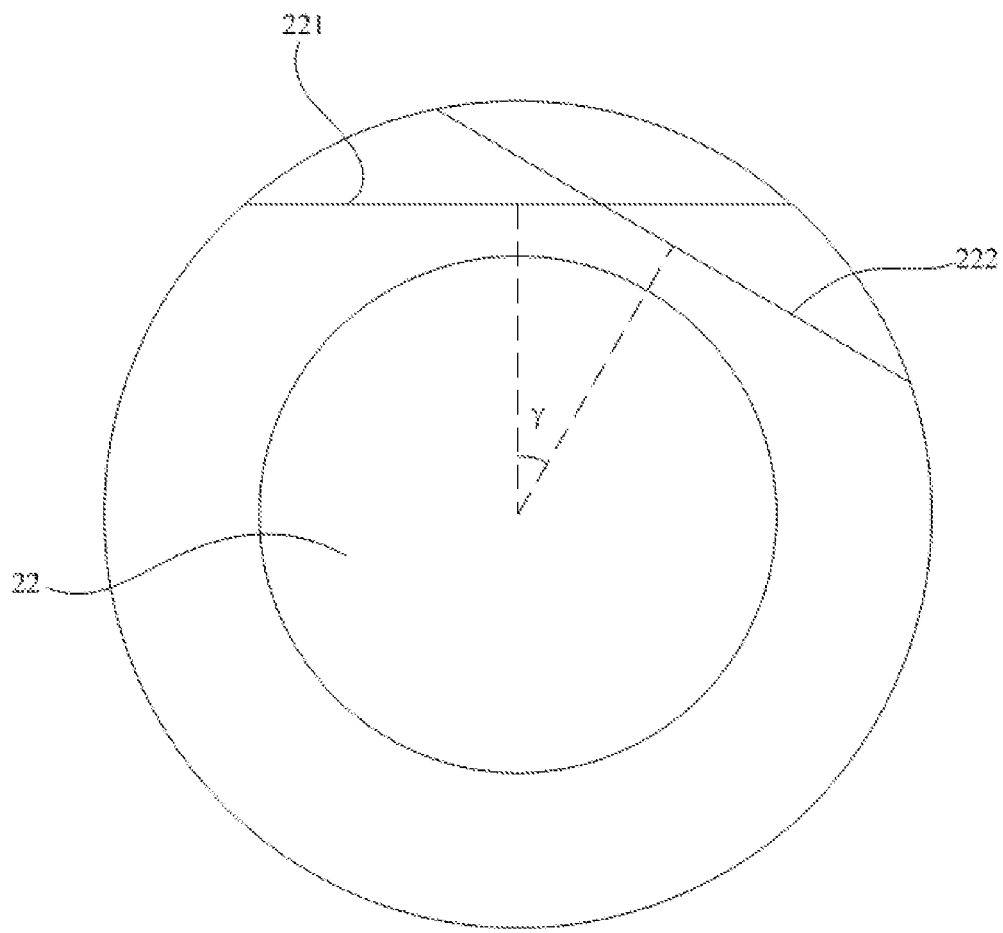
FIG. 7 is a schematic cross-sectional view of a motor shaft in FIG. 6.

Referring to FIG. 6 and FIG. 7, in this embodiment, a first flat surface 221 for driving the first pump head 3 is arranged on a peripheral surface of said one end of the motor shaft 22, and a second flat surface 222 for driving the second pump head 4 is arranged on a peripheral surface of said another end of the motor shaft 22. A normal angle between the first flat surface 221 and the second flat surface 222 is equal to the preset central angle. It can be understood that, in such a configuration, during the rotation of the motor shaft 22, when the first flat surface 221 reaches a preset position and drives the corresponding piston chamber 311 of the first pump head 3 into operation, a phase difference between the position of the second flat surface 222 and the preset position is the normal angle. In this way, a preset operating interval between the first pump head 3 and the second pump head 4 can be effectively maintained, and the process is simple and the structure is stable. It should be noted that the present design is not limited thereto. In other embodiments, the operating interval between the first pump head 3 and the second pump head 4 can be set at the preset central angle through other manners.

Second Embodiment

Figure 12:
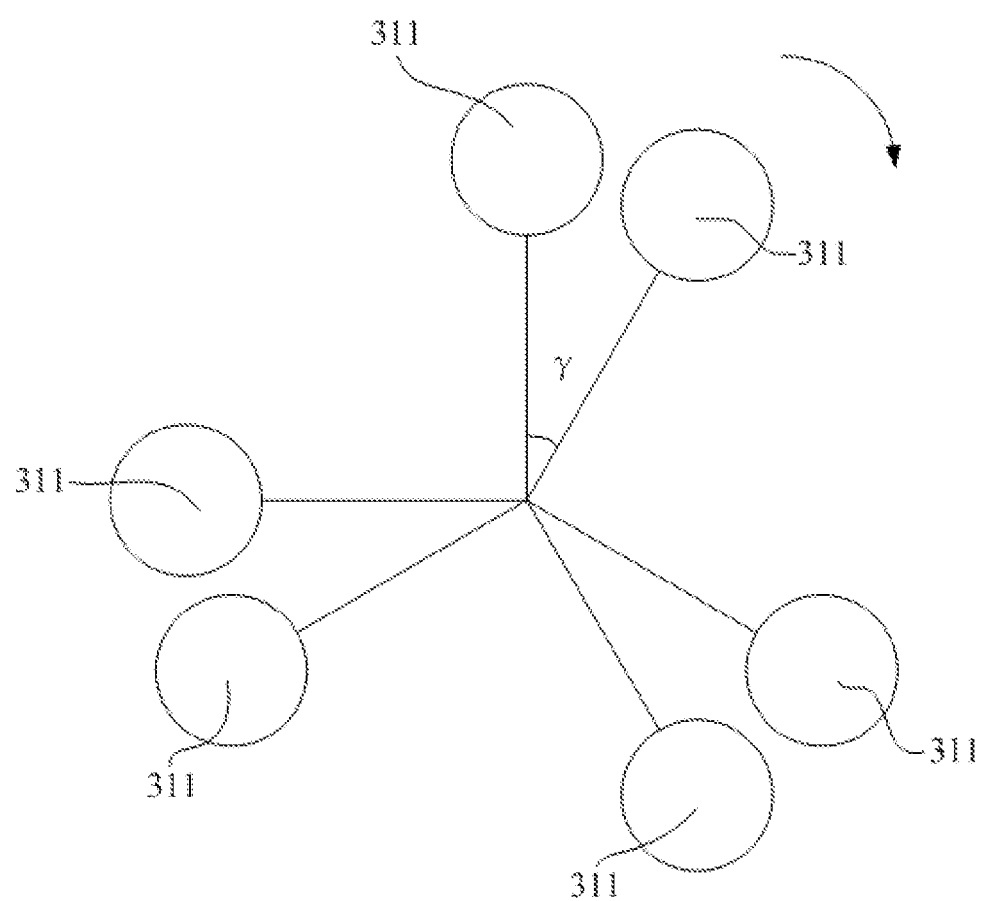
FIG. 12 is a schematic diagram of piston chambers of two piston plates of a booster pump in another embodiment in a projection plane.

As shown in FIG. 12, the difference between another embodiment of the booster pump proposed in the present disclosure and the above-mentioned embodiment lies in that: in this embodiment, the misalignment angle between a projection of each of the piston chambers 311 of the first pump head and a projection of the corresponding piston chamber 311 of the piston chambers 311 of the second pump head is directly changed, so that the angle between the adjacent piston chambers 311 in the projection plane is 30°. In other words, the embodiment can be explained as follows: the number of the piston chambers 311 of the first pump head is the same as the number of the piston chambers 311 of the second pump head; an angle between two adjacent piston chambers 311 of the first pump head or the second pump head is defined as a, and a misalignment angle between a projection of each of the piston chambers 311 of the first pump head and a projection of the corresponding piston chamber 311 of the piston chambers 311 of the second pump head in the projection plane perpendicular to the first direction is defined as β, herein α and β satisfy a relation of: β=α/4. As such, a better effect for reducing the vibration and noise can also be achieved.

The present disclosure also provides a water purification device. The water purification device includes a booster pump. The specific structure of the booster pump refers to the above-mentioned embodiments. Since the water purification device adopts all the above-mentioned embodiments, the water purification device has at least all the effects brought by the embodiment of the above-mentioned embodiments, which is not repeated herein.

What is claimed is:

1. A booster pump, comprising:
a pump body provided with a mounting cavity extending in a first direction;
a motor arranged in the mounting cavity, wherein the motor comprises a motor body, and a motor shaft passing through both ends of the motor body in the first direction; and
a first pump head and a second pump head, wherein the first pump head is mounted on a first end of the pump body in the first direction and drivingly connected to a first end of the motor shaft, and the second pump head is mounted on a second end of the pump body in the first direction and drivingly connected to a second end of the motor shaft;
wherein each of the first pump head and the second pump head is provided with a piston plate, the first and second ends of the motor shaft is connected to the corresponding piston plate of the piston plates, each of the piston plates is formed with at least two piston chambers, each piston chamber communicates with a water intake end and a water drain end of the corresponding pump head, and the piston chambers are uniformly arranged around a center of the corresponding piston plate;
wherein a projection of the piston chambers of the first pump head and a projection of the piston chambers of the second pump head are misaligned with each other in a projection plane perpendicular to the first direction.

2. The booster pump of claim 1, wherein a number of the piston chambers of the first pump head is the same as a number of the piston chambers of the second pump head, and wherein an angle between two adjacent piston chambers of the first pump head or the second pump head is defined as a, and a misalignment angle between a projection of each of the piston chambers of the first pump head and a projection of the corresponding piston chamber of the piston chambers of the second pump head in the projection plane is defined as β, wherein α and β satisfy a relation of: β=α/2.

3. The booster pump of claim 1, wherein a number of the piston chambers of the first pump head is the same as a number of the piston chambers of the second pump head, and wherein an angle between two adjacent piston chambers of the first pump head or the second pump head is defined as α, and a misalignment angle between a projection of each of the piston chambers of the first pump head and a projection of a corresponding piston chamber of the piston chambers of the second pump head in the projection plane is defined as β, wherein α and β satisfy a relation of: β=α/4.

4. The booster pump of claim 2, wherein each of the first pump head and the second pump head is provided with three piston chambers, and α satisfies a relation of: α=120°.

5. The booster pump of claim 1, wherein a number of the piston chambers of the first pump head is the same as a number of the piston chambers of the second pump head, and an operating interval between the first pump head and the second pump head is set at a preset central angle.

6. The booster pump of claim 5, wherein a misalignment angle between a projection of each of the piston chambers of the first pump head and a projection of a corresponding piston chamber of the piston chambers of the second pump head in a projection plane perpendicular to the first direction is defined as β, and the preset central angle is defined as γ, wherein β and γ satisfy a relation of: γ=β/2.

7. The booster pump of claim 6, wherein β satisfies a relation of: β=60°.

8. The booster pump of claim 5, wherein a first flat surface for driving the first pump head is arranged on a peripheral surface of the first end of the motor shaft, a second flat surface for driving the second pump head is arranged on a peripheral surface of the second end of the motor shaft, and a normal angle between the first flat surface and the second flat surface is equal to the preset central angle.

9. The booster pump of claim 1, wherein an interval between projections of any two adjacent piston chambers is regular.

10. The booster pump of claim 1, wherein a first membrane is arranged on an inner side of a water inlet of each piston chamber, and a second membrane is arranged on an outer side of a water outlet of each piston chamber, and wherein the motor is a dual-shaft motor, the first and second ends of the motor shaft of the motor being connected to the first membrane through an inclined bushing to drive the first membrane into a push and pull motion in an axial direction.

11. The booster pump of claim 1, wherein each of the first pump head and the second pump head forms a hollow discoid shape.

12. A water purification device, comprising a booster pump, wherein the booster pump comprises:
a pump body provided with a mounting cavity extending in a first direction;
a motor arranged in the mounting cavity, wherein the motor comprises a motor body, and a motor shaft passing through both ends of the motor body in the first direction; and
a first pump head and a second pump head, wherein the first pump head is mounted on a first end of the pump body in the first direction and drivingly connected to a first end of the motor shaft, and the second pump head is mounted on a second end of the pump body in the first direction and drivingly connected to a second end of the motor shaft;
wherein each of the first pump head and the second pump head is provided with a piston plate, the first and second ends of the motor shaft is connected to the corresponding piston plate of the piston plates, each of the piston plates is formed with at least two piston chambers, each piston chamber communicates with a water intake end and a water drain end of the corresponding pump head, and the piston chambers are uniformly arranged around a center of the corresponding piston plate;
wherein a projection of the piston chambers of the first pump head and a projection of the piston chambers of the second pump head are misaligned with each other in a projection plane perpendicular to the first direction.

13. The water purification device of claim 12, wherein the water purification device is a water purifier; or the water purification device is an automatic filter.

* * * * *